United States Patent [19]

Blake

[11] Patent Number: 5,934,699

[45] Date of Patent: Aug. 10, 1999

[54] TRAILER HITCH COVER ASSEMBLY

[76] Inventor: Robert B. Blake, 1915 Long Lake Shores, Bloomfield, Mich. 48302

[21] Appl. No.: 08/795,481

[22] Filed: Feb. 11, 1997

[51] Int. Cl.[6] .......................................................... B60D 1/01
[52] U.S. Cl. ............................................ 280/507; 280/155
[58] Field of Search ..................................... 280/507, 847, 280/848, 851, 155, 500, 491.2; 248/231.41, 231.7, 231.9, 228.1, 228.3; 293/112

[56] References Cited

U.S. PATENT DOCUMENTS

| | | | |
|---|---|---|---|
| 359,476 | 3/1887 | Stivers | 280/155 |
| 5,560,631 | 10/1996 | Salvo | 280/507 |
| 5,628,536 | 5/1997 | Fulkerson | 280/507 |

*Primary Examiner*—Robert J. Oberleitner
*Assistant Examiner*—C. T. Bartz
*Attorney, Agent, or Firm*—Bliss McGlynn, P.C.

[57] ABSTRACT

A trailer hitch cover assembly for a motor vehicle includes a hitch insert for connection to either a hitch tube of a trailer hitch or vehicle structure on a motor vehicle, a top cover plate mounted to the hitch insert and a front cover plate mounted to the hitch insert and having an aperture extending therethrough aligned with the hitch tube of the trailer hitch.

18 Claims, 3 Drawing Sheets

TRAILER HITCH COVER ASSEMBLY

BACKGROUND OF THE INVENTION

1. Field of the Invention

The present invention relates generally to motor vehicles and, more particularly, to a trailer hitch cover assembly for a motor vehicle.

2. Description of the Related Art

It is known that motor vehicles may be provided with a trailer hitch to pull a trailer. Typically, the motor vehicle has a trailer hitch having a hitch tube secured to the motor vehicle beneath the bumper and a ball connector having an insert tube disposed in the hitch tube. A locking pin extends through the tubes to secure the insert tube to the hitch tube. The trailer generally includes a tonque beam which is releasibly attached to the ball connector as is known in the art.

Although the above trailer hitch has worked well for towing a trailer by a motor vehicle, it suffers from the disadvantage that the trailer hitch is subjected to stones and other road debris forcefully hurled by the wheels of either the motor vehicle and/or trailer which may result in degradation of appearance or physical damage to the trailer hitch. Therefore, there is a need in the art to provide a trailer hitch cover for a motor vehicle.

SUMMARY OF THE INVENTION

It is, therefore, one object of the present invention to provide a trailer hitch cover assembly for a motor vehicle.

It is another object of the present invention to provide a trailer hitch cover assembly which shields a trailer hitch and motor vehicle against stones and debris.

It is yet another object of the present invention to provide a trailer hitch cover assembly which provides a decorative appearance to the motor vehicle.

To achieve the foregoing objects, the present invention is a trailer hitch cover assembly for a motor vehicle. The trailer hitch cover assembly includes a hitch insert for connection to either a hitch tube of a trailer hitch or vehicle structure on a motor vehicle. The trailer hitch cover assembly also includes a top cover plate mounted to the hitch insert and a front cover plate mounted to the hitch insert and having an aperture extending therethrough aligned with the hitch tube of the trailer hitch.

One advantage of the present invention is that a trailer hitch cover assembly is provided for a motor vehicle. Another advantage of the present invention is that the trailer hitch cover assembly shields the trailer hitch and motor vehicle against stones and debris from the road. Yet another advantage of the present invention is that the trailer hitch cover assembly provides a decorative appearance with additional taillight and/or reflectors to the motor vehicle and reduces the possibility of physical damage to the trailer hitch and/or motor vehicle.

Other objects, features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
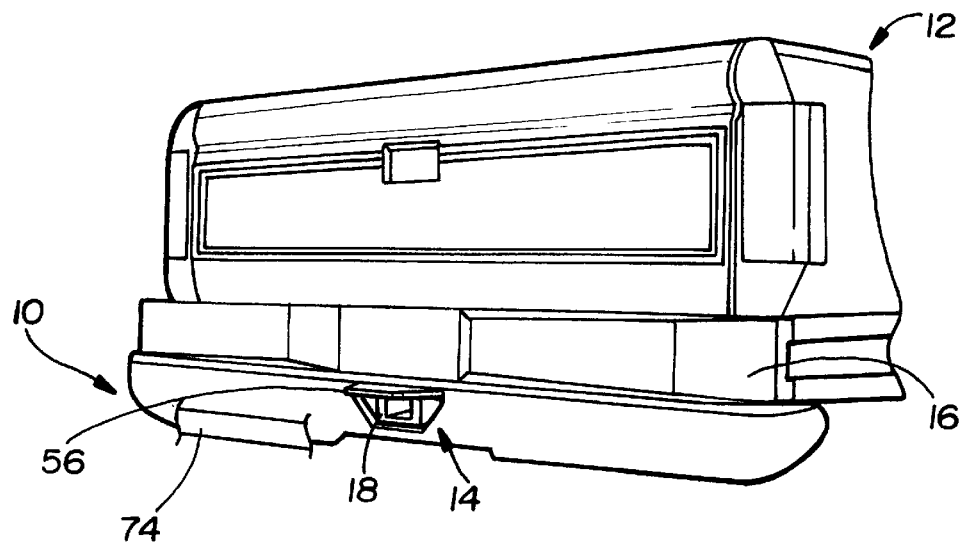
FIG. 1 is a perspective view of a trailer hitch cover assembly, according to the present invention, illustrated in operational relationship with a motor vehicle.
Figure 2:
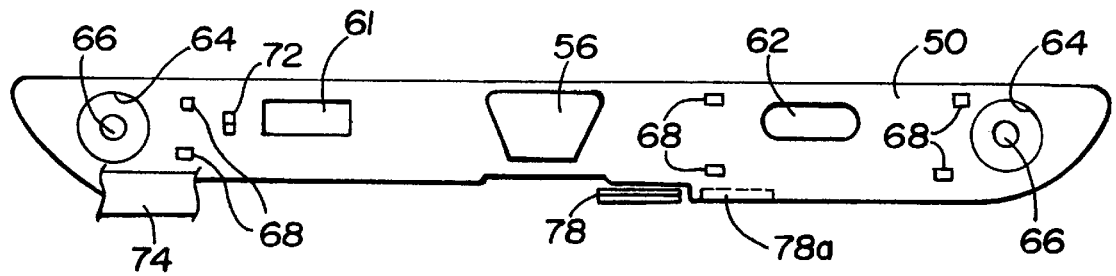
FIG. 2 is a front elevational view of the trailer hitch cover assembly of FIG. 1.
Figure 3:
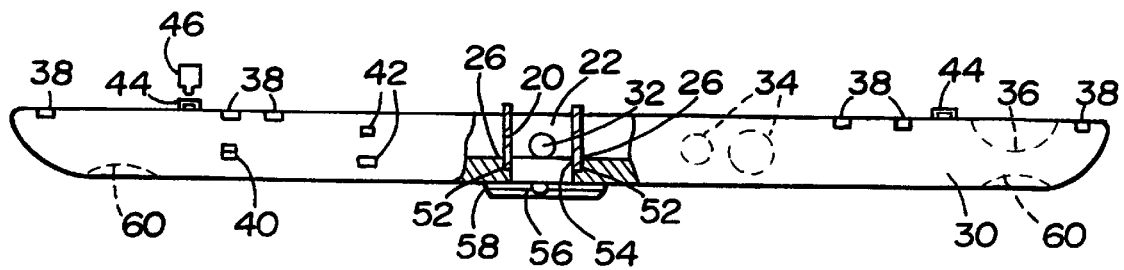
FIG. 3 is a plan view of the trailer hitch cover assembly of FIG. 1.

Referring to the drawings and in particular FIG. 1, one embodiment of a trailer hitch cover assembly 10, according to the present invention, is illustrated in operational relationship with a motor vehicle, generally indicated at 12. As illustrated, the motor vehicle 12 is of a pick-up type known in the art although any type of motor vehicle may be used in connection with the trailer hitch cover assembly 10. The motor vehicle 12 includes a trailer hitch, generally indicated at 14, secured to structure of the motor vehicle 12 beneath a rear bumper 16 of the motor vehicle 12. The trailer hitch 14 includes a hitch tube 18 extending longitudinally of the motor vehicle 12 to receive an insert tube (not shown) of a ball connector (not shown) for the trailer hitch 14. The hitch tube 18 is generally rectangular in shape although any suitable shape may be used. It should be appreciated that the trailer hitch 14 is conventional and known in the art.

Referring to FIGS. 1 through 4, the trailer hitch cover assembly 10 includes a hitch insert 20 for connection to the hitch tube 18 of the trailer hitch 14 and/or the rear bumper 16 of the motor vehicle 12 without a trailer hitch. The hitch insert 20 includes an aperture 21 extending therethrough to allow a screw mount or ball clamp to extend through an aperture (not shown) in the rear bumper 16, thus also creating an additional locking pin.

The hitch insert 20 is generally rectangular in shape and has an aperture 22 extending longitudinally therethrough to fit over the hitch tube 18. The hitch insert 20 also has an aperture 24 extending transversely therethrough to receive a locking pin (not shown) of the trailer hitch 14 to secure the hitch insert 20 to the hitch tube 18. It should be appreciated that the locking pin is extended to pass completely through the hitch insert 20.

The hitch insert 20 also includes a flange 26 extending transversely on each side at a forward end of the aperture 22 for a function to be described. The hitch insert 20 may be made of a plastic or metal material. It should be appreciated that the hitch insert 20 can be larger or smaller in size to accommodate different classes of trailer hitches such as a class 2 through 6 trailer hitch or additional size and shape for application to the motor vehicle 12 itself.

The trailer hitch cover assembly 10 includes a top cover plate 30 mounted to the hitch insert 20. The top cover plate 30 extends transversely along the length of the rear bumper 16 and longitudinally a sufficient or predetermined length to provide a decorative appearance. The top cover plate 30 may include an aperture 32 extending therethrough and aligned with the aperture 21 to act as an access hole for a ball clamp (not shown) secured to the hitch tube 18 which is conventional and known in the art.

The top plate 30 may include at least one electrical punch-out 34 for an electrical mounting plug (not shown). The top cover plate 30 may include at least one, preferably a pair of exhaust punch-outs 36 for access to exhaust tailpipes (not shown) of the motor vehicle 12. The top cover plate 30 may also include at least one, preferably a plurality of rear access slots 38 to allow for clearance of a frame (not shown) of the trailer hitch 14. The top cover plate 30 may also include at least one clip 40 for loose wires (not shown).

The top cover plate 30 includes at least one, preferably a plurality of apertures 42 extending therethrough for a function to be described. The top cover plate 30 includes at least one, preferably a plurality of spacer clips 44 to receive a portion of corresponding spacers 46 (FIG. 4) which each have through strap application slots and extend longitudinally to space longitudinally the top cover plate 30 from the rear end of the motor vehicle 12. The top cover plate 30 is a relatively thin piece made of a metal or plastic material. It should be appreciated that the top cover plate 30 is not a bumper or step and is decorative while providing limited protection from stones and debris to the trailer hitch 14 and/or motor vehicle 12.

The trailer hitch cover assembly 10 further includes a front cover plate 50 mounted to the hitch insert 20. The front cover plate 50 extends transversely along the length of the rear bumper and vertically a sufficient or predetermined length to provide a decorative appearance. The front cover plate 50 includes a pair of recesses 52 spaced and extending transversely. The recesses 52 are generally rectangular in shape to receive the flanges 26 of the hitch insert 20. The front cover plate 50 also includes an aperture 54 extending longitudinally therethrough aligned with the hitch tube 18. The aperture 54 allows the insert tube (not shown) of the ball connector to extend through the front cover plate 50 and hitch insert 20 and be disposed in the hitch tube 18. The front cover plate 50 includes a rotatable door 56 to cover the aperture 54. The door 56 is pivotally connected by a pin member 57 to the front cover plate 50 and is urged into a closed position by a spring 58. The door 56 is generally trapezoidal in shape although any suitable shape or additional insert plugs (not shown) may also be applied to cover the aperture 54. The door 56 may include indicia such as a logo or the like. It should be appreciated that the door 56 covers the aperture 54 for the insert tube to extend through when not in use.

The front cover plate 50 includes at least one, preferably a plurality of recesses 60 to accommodate a reflector and or light (not shown). The recesses 60 may include a punch-out (not shown) for an optional taillight. The front cover plate 50 may include at least one recess 16 for a sticker (not shown). The front cover plate 50 may include at least one clear cover plate insert 62 with side tabs (not shown) to accommodate a retail advertisement logo sticker. It should be appreciated that the clear cover plate insert 62 removably engages the front cover plate 50 and the sticker is disposed beneath the insert 62.

The front cover plate 50 may include at least one, preferably a plurality of punch-outs 64 to accommodate exhaust tailpipes of the motor vehicle. The punch-outs 64 may include a reflector 66. It should be appreciated that the reflector 66 may be of a snap-in or screw type for engagement with the front cover plate 50.

Figure 4:
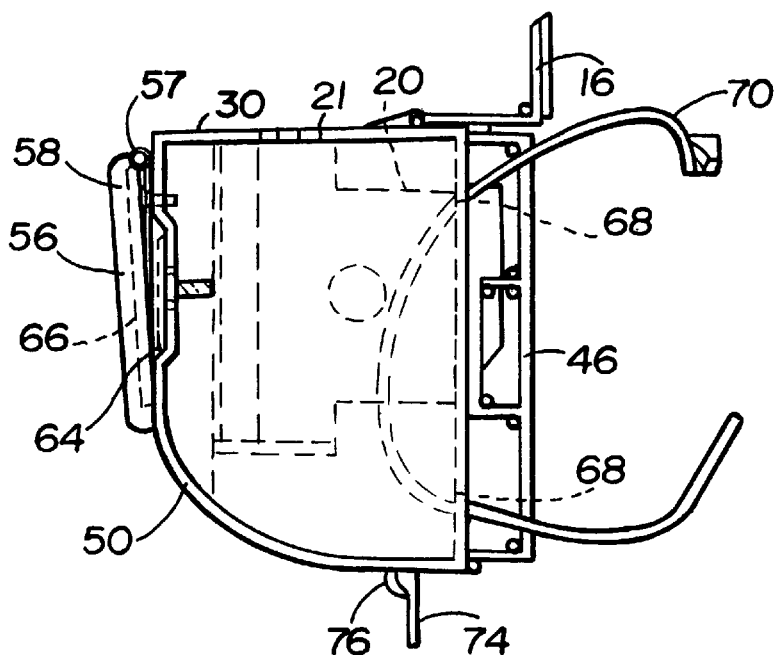
FIG. 4 is a side elevational view of the trailer hitch cover assembly of FIG. 1.

The front cover plate 50 includes at least one, preferably a plurality of apertures 68 extending therethrough to receive straps 70 (FIG. 4). The straps 70 are made of a plastic material and wrap around the trailer hitch 14 or are connected to the rear bumper 16. Optionally, a retainer (not shown) may be used for the straps 70. The retainer may be attached to the trailer hitch cover assembly 10 or rear bumper 16 by fasteners such as screws or by an adhesive. The retainer has slots through which the straps 70 slide. It should be appreciated that the straps 70 are of a tie type and are known in the art.

The front cover plate 50 may include at least one clip 72 to retain loose wires. The front cover plate 50 is made of a metal or plastic material and is integral and unitary with the top cover plate 30. The front cover plate 50 may include a sweep 74 which extends transversely therealong, preferably substantially the entire length of the trailer hitch 14. The sweep 74 is made of an elastomeric or rubber-like material and is held in a track 76 of the front cover plate 50 by suitable means such as an interference fit or an adhesive. It should be appreciated that the sweep 74 provides limited protection to the trailer hitch 14 from stones and debris.

Optionally, the trailer hitch cover assembly 10 may include a finder plate 78 which allows looking under the trailer hitch cover assembly 10 or motor vehicle 12 without bending down on ground level for hook-up of electrical or hitch functions. The finder plate 78 may slide out of a track 78a on the front cover plate 50 or swing-out by a hinged connection (not shown) to the front cover plate 50. The finder plate 78 has a mirrored surface on at least one side and is stored in place on the track 78a or the front cover plate 50 by a release clip (not shown).

Additionally, the trailer hitch cover assembly 10 may include templates (not shown) for the top cover plate 30 to allow the top cover plate 30 to be cut for clearance with factory molded drop bumpers. The templates are made of paper or cardboard and laid on the top cover plate 30 to allow the top cover plate 30 to be cut along the template with a saw such as a Jig-saw.

Figure 5:
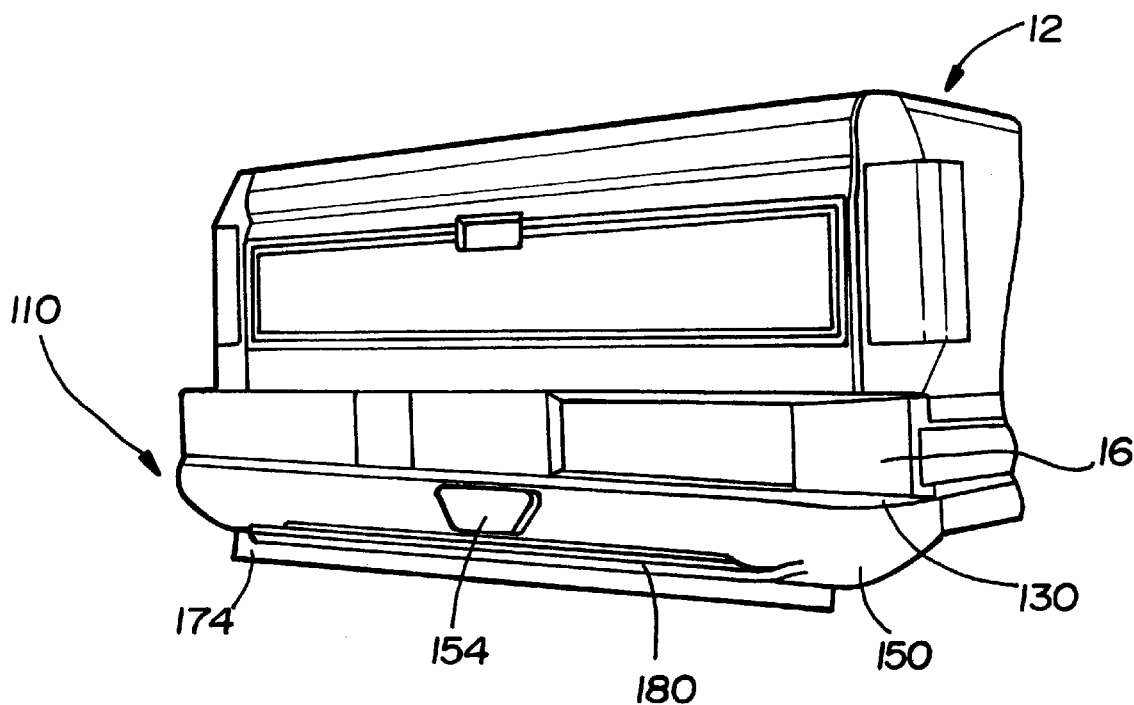
FIG. 5 is a perspective view of another embodiment, according to the present invention, of the trailer hitch cover assembly of FIG. 1.
Figure 6:
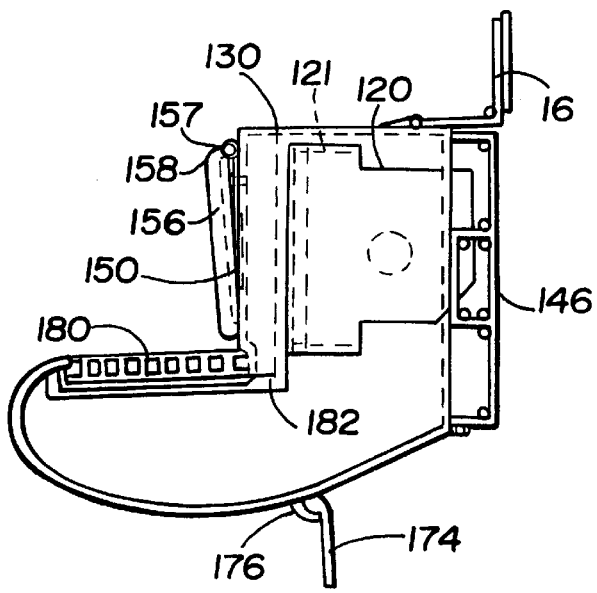
FIG. 6 is a side elevational view of the trailer hitch cover assembly of FIG. 5.
Figure 7:
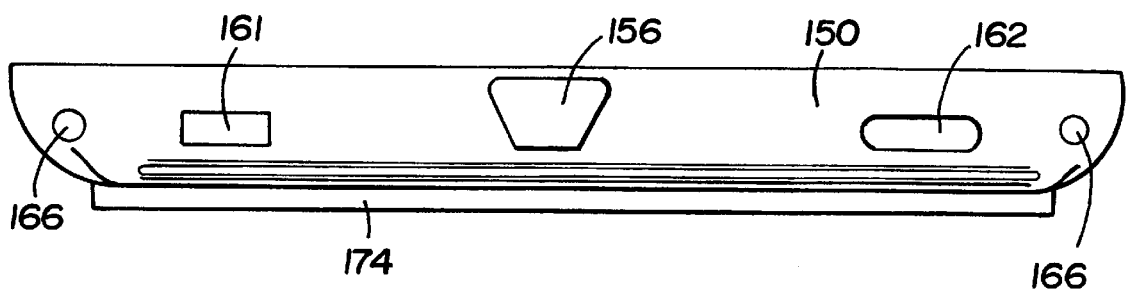
FIG. 7 is a front elevational view of the trailer hitch cover assembly of FIG. 5.

Referring to FIGS. 5 through 7, another embodiment 110, according to the present invention, of the trailer hitch cover assembly 10 is shown. Like parts of the trailer hitch cover assembly 10 have like reference numerals increased by one hundred. The trailer hitch cover assembly 110 includes a step 180 extending longitudinally and generally perpendicular to the front cover plate 150. The step 180 extends transversely a sufficient amount or predetermined length. The step 180 is supported by a support member 182 connected to the top cover plate 130 and has a reverse "L" shape extending vertically and horizontally to extend under the step 180. The support 182 is made of a metal material. It should be appreciated that the front cover plate 150 extends downwardly and longitudinally from the step 180 to cover the trailer hitch 14 or undermount of motor vehicle applications.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A trailer hitch cover assembly for a motor vehicle comprising:

a hitch insert having a first aperture extending longitudinally therethrough to fit over a hitch tube of a trailer hitch on a motor vehicle;

a top cover plate mounted to said hitch insert; and a front cover plate mounted to said hitch insert and having a second aperture extending therethrough aligned with the hitch tube of the trailer hitch.

2. A trailer hitch cover assembly as set forth in claim 1 including a door pivotally connected to said front cover plate to cover said second aperture.

3. A trailer hitch cover assembly as set forth in claim 2 including a spring member to urge said door in a closed position to cover said second aperture.

4. A trailer hitch cover assembly as set forth in claim 1 including means for securing said assembly to either the trailer hitch or the motor vehicle.

5. A trailer hitch cover assembly as set forth in claim 4 wherein said means comprises at least one strap extending through either said top cover plate or said front cover plate and around the trailer hitch or bumper of the motor vehicle.

6. A trailer hitch cover assembly for a motor vehicle comprising:
- a hitch insert for connection to either one of a hitch tube of a trailer hitch or vehicle structure on a motor vehicle;
- a top cover plate mounted to said hitch insert: and
- a front cover plate mounted to said hitch insert and having an aperture extending therethrough aligned with the hitch tube of the trailer hitch: and
- said front cover plate including a plurality of recesses and said hitch insert including a plurality of flanges, said flanges being disposed in said recesses.

7. A trailer hitch cover assembly as set forth in claim 1 wherein said top cover plate and said front cover plate include at least one punch-out.

8. A trailer hitch cover assembly as set forth in claim 1 wherein said top cover plate and said front cover plate include at least one clip for loose wires.

9. A trailer hitch cover assembly as set forth in claim 1 wherein said top cover plate and said front cover plate include at least one recess for a light or reflector.

10. A trailer hitch cover assembly as set forth in claim 1 wherein said top cover plate and said front cover plate include at least one recess for a sticker.

11. A trailer hitch cover assembly as set forth in claim 1 including a step extending generally perpendicularly from said front cover plate.

12. A trailer hitch cover assembly as set forth in claim 11 including a support connected to said top cover plate and supporting said step.

13. A trailer hitch cover assembly as set forth in claim 1 wherein said top cover plate and said front cover plate are integral and unitary.

14. A trailer hitch cover assembly as set forth in claim 1 wherein said top cover plate, front cover plate and hitch insert are made from either a plastic or metal material.

15. A trailer hitch cover assembly for a motor vehicle comprising:
- a hitch insert having a first aperture extending longitudinally therethrough to fit over a hitch tube of a trailer hitch on a motor vehicle;
- a top cover plate mounted to said hitch insert;
- a front cover plate mounted to said hitch insert and having a second aperture extending therethrough aligned with the hitch tube of the trailer hitch;
- a door pivotally connected to said front cover plate to cover said second aperture; and
- means for securing said assembly to either the trailer hitch or the motor vehicle.

16. A trailer hitch cover assembly for a motor vehicle comprising:
- a hitch insert having a first aperture extending longitudinally therethrough to fit over a hitch tube of a trailer hitch on a motor vehicle;
- a top cover plate mounted to said hitch insert;
- a front cover plate mounted to said hitch insert and having a second aperture extending therethrough aligned with the hitch tube of the trailer hitch;
- a door pivotally connected to said front cover plate to cover said second aperture; and
- a step extending generally perpendicularly from said front cover plate.

17. A trailer hitch cover assembly as set forth in claim 16 including a support connected to said top cover plate and supporting said step.

18. A trailer hitch cover assembly for a motor vehicle comprising:
- a hitch insert having a first aperture extending longitudinally therethrough to fit over a hitch tube of a trailer hitch on a motor vehicle;
- a top cover plate mounted to said hitch insert;
- a front cover plate mounted to said hitch insert and having a second aperture extending therethrough aligned with the hitch tube of the trailer hitch; and
- a finder plate having a mirrored surface on at least one side and operatively connected to said front cover plate to allow looking under said trailer hitch cover assembly.

* * * * *

UNITED STATES PATENT AND TRADEMARK OFFICE
CERTIFICATE OF CORRECTION

PATENT NO.   : 5,934,699
DATED        : August 10, 1999
INVENTOR(S)  : Robert B. Blake It is certified that error appears in the above-identified patent and that said Letters Patent is hereby corrected as shown below:

<u>Title page,</u>
The following cited references should be added:

| | | |
|---|---|---|
| D192,684  | 05/01/62 | Knowles |
| 2,080,161 | 05/11/37 | Berggren |
| 3,058,757 | 10/16/62 | Sullivan |
| 3,095,058 | 06/25/63 | Woytowich |
| 3,746,366 | 07/17/73 | Bruce et al. |
| 4,138,130 | 02/06/79 | Pickrell et al. |
| 4,319,764 | 03/16/82 | Whitaker |
| 4,798,409 | 01/17/89 | Miller |
| 4,928,993 | 05/29/90 | Appavoo |
| 4,966,378 | 10/30/90 | Cook |
| 5,121,944 | 06/16/92 | Haddox |

Signed and Sealed this

Twenty-first Day of August, 2001

*Attest:*

*Attesting Officer*

NICHOLAS P. GODICI
*Acting Director of the United States Patent and Trademark Office*